Oct. 13, 1970 G. A. ROTH 3,533,582
SPREADER DEVICE FOR THE DISPERSAL OF GRANULAR MATERIALS
AND CHEMICALS FROM AN AIRCRAFT
Filed July 9, 1968 3 Sheets-Sheet 1
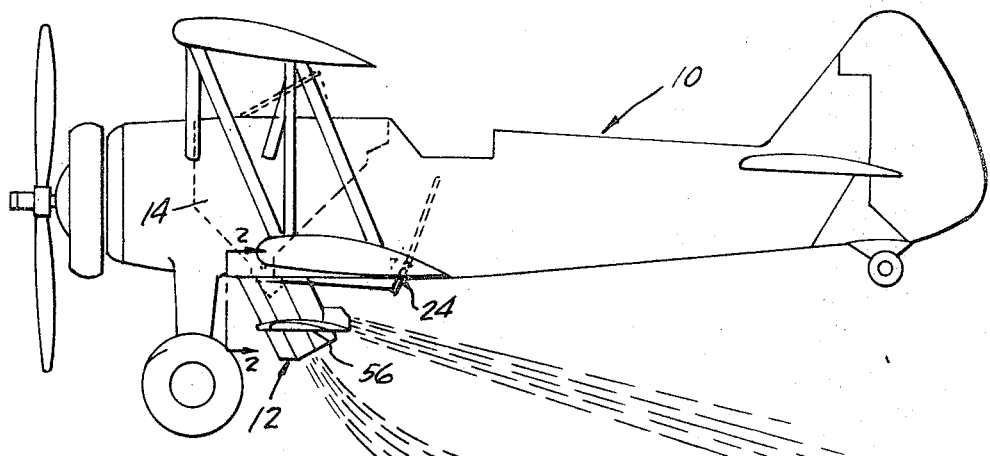
FIG. 1.
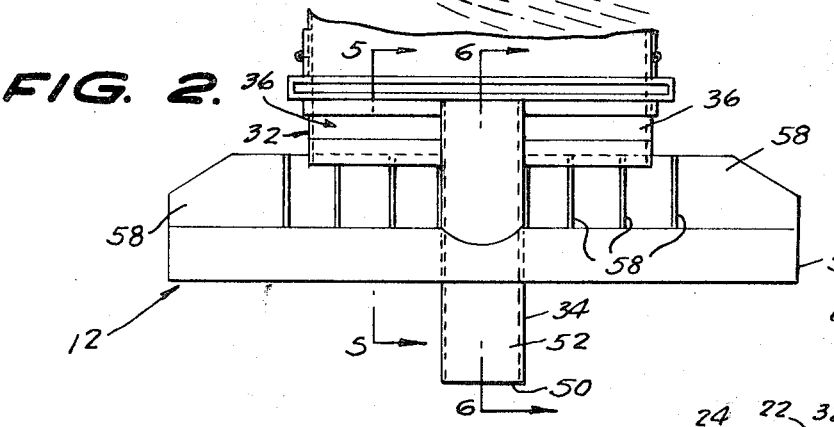
FIG. 2.
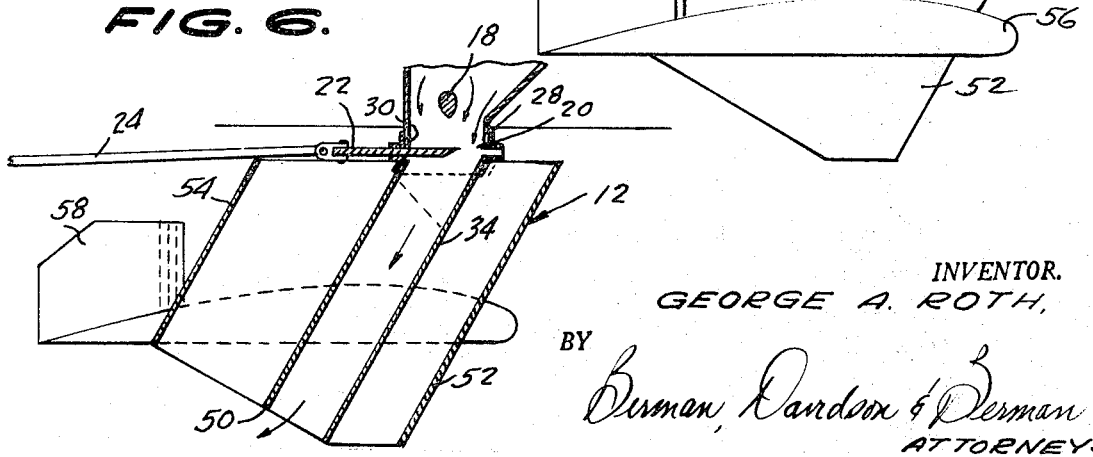
FIG. 5.
FIG. 6.
INVENTOR.
GEORGE A. ROTH,
BY
Berman, Davidson & Berman
ATTORNEYS.

Oct. 13, 1970 G. A. ROTH 3,533,582
SPREADER DEVICE FOR THE DISPERSAL OF GRANULAR MATERIALS
AND CHEMICALS FROM AN AIRCRAFT
Filed July 9, 1968 3 Sheets-Sheet 2

INVENTOR.
GEORGE A. ROTH,
BY
Berman, Davidson & Berman
ATTORNEYS.

Oct. 13, 1970
G. A. ROTH
3,533,582
SPREADER DEVICE FOR THE DISPERSAL OF GRANULAR MATERIALS
AND CHEMICALS FROM AN AIRCRAFT
Filed July 9, 1968
3 Sheets-Sheet 3
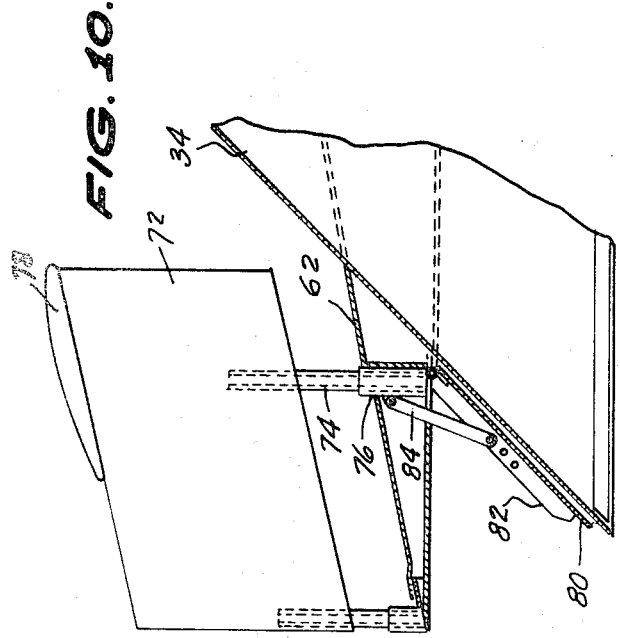
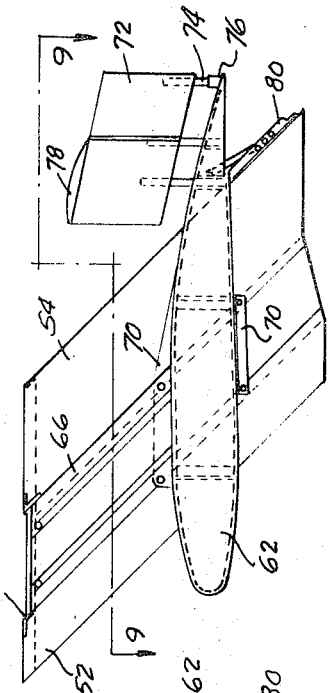
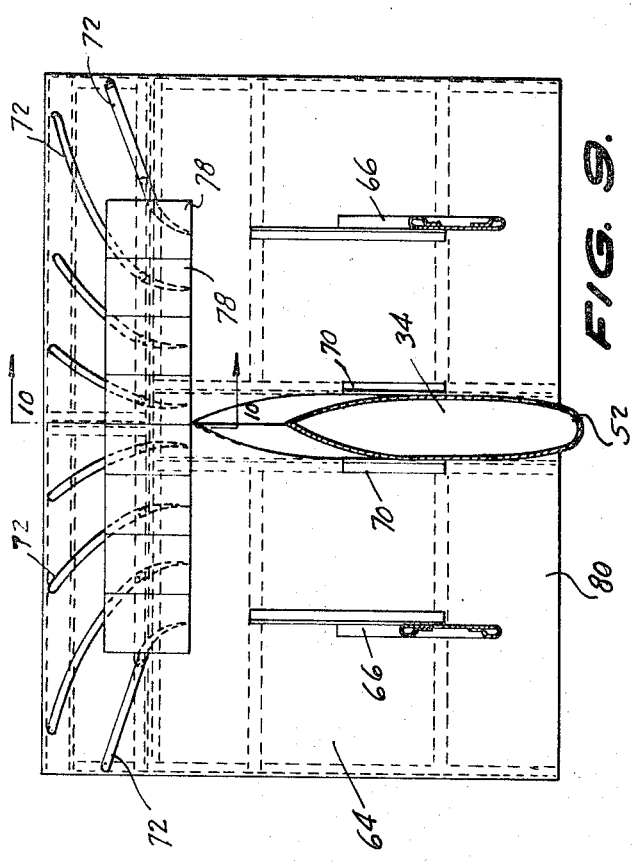
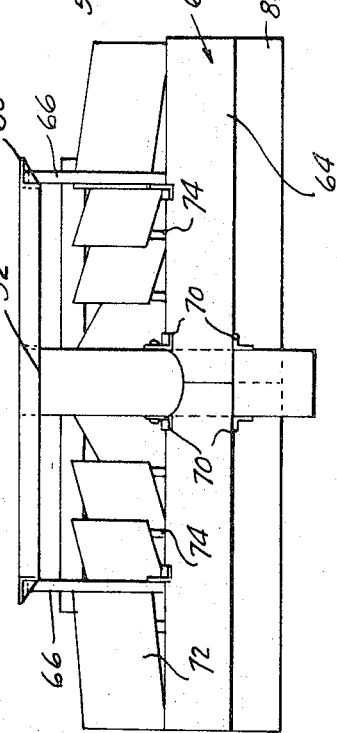
INVENTOR.
GEORGE A ROTH,
BY
Berman, Davidson & Berman
ATTORNEYS.

United States Patent Office 3,533,582
Patented Oct. 13, 1970

3,533,582
SPREADER DEVICE FOR THE DISPERSAL OF
GRANULAR MATERIALS AND CHEMICALS
FROM AN AIRCRAFT
George A. Roth, 215 Aiokoa St.,
Kailua, Hawaii 96734
Filed July 9, 1968, Ser. No. 743,385
Int. Cl. B64d 1/16
U.S. Cl. 244—136                10 Claims

ABSTRACT OF THE DISCLOSURE

Apparatus for the dispensing and dispersal of seeds, granular material and chemicals and the like from an aircraft, in which hopper means are provided for storing the material and a chute is provided for discharging the material from the hopper out into the aircraft slipstream below the aircraft center and lateral chutes are provided for dispensing the material from the hopped onto a spreader wing below the lateral chutes, which wing is provided with curved guide vanes for uniformly distributing the material over a predetermined area and the wing further is secured to the center chute and is of cantilever design so that it requires no external bracing and contributes to the lift of the aircraft.

The present invention relates to a low-drag wing-type spreader device for the dispersal of seeds, granular materials, fertilizers, and chemicals from an aircraft.

It is an object of the present invention to provide a dispenser for granular materials having the configuration of a small wing which contributes to the lift of the aircraft and thus improves the aircraft performance while permitting the aircraft to have secured thereto a chute for dispersing granular materials, such as fertilizer and the like, over a uniform, predetermined area.

It is another object of the present invention to provide a dispenser for discharging granular materials from an aircraft having fairings on a center chute to which a wing is secured to reduce to a minimum the drag on the aircraft.

It is yet another object of the present invention to provide a spreader device for the dispersal of granular material and the like that has less drag than the conventional Venturi-type, high capacity spreaders used with aircraft and which, therefore, requires less horsepower to drag it through the air.

It is yet another object of the present invention to provide a spreader device for the dispersal of materials and chemicals from an aircraft which has a relatively unlimited capacity because the available air energy for moving material through the spreader is not limited by an enclosed inlet area.

Another object of the present invention is to provide a spreader device for the dispersal of materials from an aircraft which will disperse a wide variety of materials in an equally effective manner at varying rates of dispersal.

Yet another object of the present invention is to provide a low aspect ratio wing which generates strong wing tip vortices that assist in dispersing materials laterally, particularly those of lesser density.

Another object of the present invention is to provide a spreader device having a center chute which discharges material at or below the propellor arc and thus reduces the propellor slipstream effect on the dispersed material.

A further object of the present invention is to provide a spreader device in which available air energy through the spreader is not wasted on accelerating the bulk of the material which passes through the center chute and is permitted to fall free directly under the center of the aircraft, so as to allow the available air energy to act on the material passing through the lateral chutes, thus accelerating and deflecting the material outwardly in wider effective swaths.

Another object of the present invention is to provide a spreader device having a center chute and side or lateral chutes on the opposite sides thereof, which are inclined at a backward angle, so as to cause the material being discharged to be directed aft relative to the aircraft. Additionally, as the material is drawn from the lateral or side chutes by the low pressure generated as the airstream passes over the curved upper surface of a spreader wing secured to the center chute, the material is accelerated still more in a direction opposite to that of the direction of the aircraft.

Another object of the present invention is to provide a center chute with a lateral chute disposed on opposite sides thereof and a curved spreader wing of cantilever configuration with a plurality of curved guide vanes on said wing so that as the material being dispensed at a relatively high velocity, depending on the mass drag characteristics of the particles of the particular material, it will impinge upon or strike the vanes which are set at varying angles across the spreader span or wing. These vanes will then deflect the material laterally or outwardly from the center of the aircraft and cause it to be deposited in a wide swath on the ground.

Another object of the present invention is to provide a spreader device for the dispersal of material from an aircraft in which a wing-type spreader or span is utilized with a plurality of deflector vanes thereon so that a wing tip vortex is generated by the spreader wing as it moves through the air to entrain some of the material deflected by the vanes so as to move this lightweight material outwardly from the wing tips.

Various other objects and advantages of the present invention will be readily apparent from the following detailed description when considered in connection with the accompanying drawings forming a part thereof, and in which:

FIG. 1 is a side view of an aircraft in which is embodied the material dispenser device of the present invention;

FIG. 2 is a front enlarged view taken along the lines 2—2 of FIG. 1, illustrating the dispenser device of present invention;

FIG. 5 is a sectional view taken along the lines 5—5 of FIG. 2;

FIG. 6 is a sectional view taken along the lines 6—6 of FIG. 2;

FIG. 7 is a view of a modification of the invention;

FIG. 8 is an elevational view of the modification shown in FIG. 7;

FIG. 9 is a view taken along the lines 9—9 of FIG. 8; and

FIG. 10 is a view taken along the lines 10—10 of FIG. 9.

Figure 3:
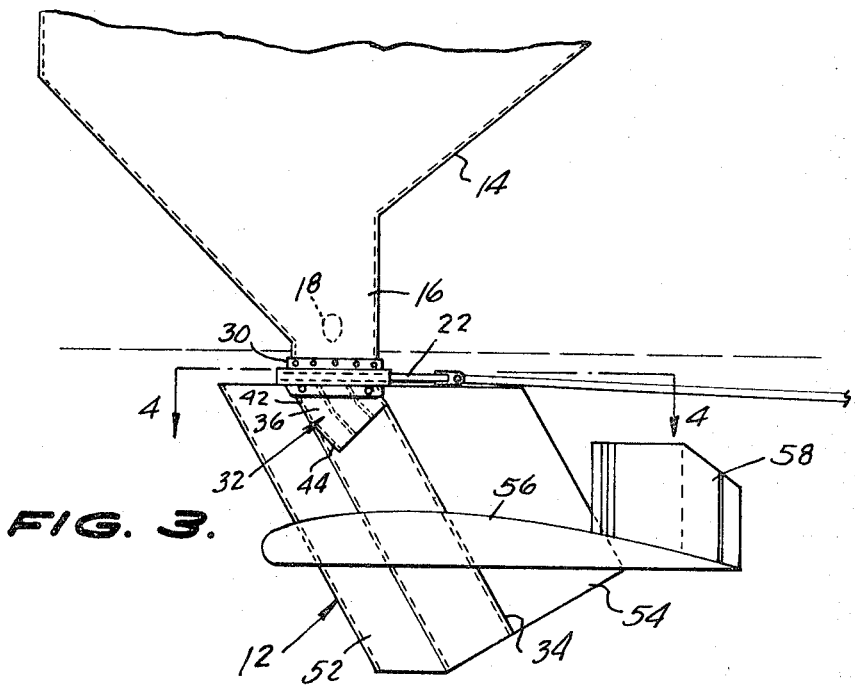
FIG. 3 is a side elevational view of the spreader device shown in FIG. 2.

Referring to the drawings, the reference numeral 10 generally designates an aircraft or airplane utilized for dispersing granular material and chemicals and the like over a large area, such as a field where crops are to be planted. The aircraft 10 may be of any well known conventional design and has a spreader device generally designated as 12 secured to the lower portion of the aircraft. The spreader device 12 is in communication with a storage hopper 14, which is disposed within the fuselage of the plane. Referring to FIG. 3, it will be noted that the storage hopper necks downwardly adjacent its lower portion, as indicated at 16, and is provided with a cross bar 18 in the discharge opening thereof. The hopper bottoms and walls are inclined so that the material can be readily discharged through the outlet opening 20, as best seen in FIGS. 5 and 6. It will be noted that the outlet opening 20 is provided with a slidable, horizontal closure gate 22 connected to a linkage generally designated as 24, which can be operated by the pilot by any well-known and conventional means and which does not form a part of the invention.

Figure 4:
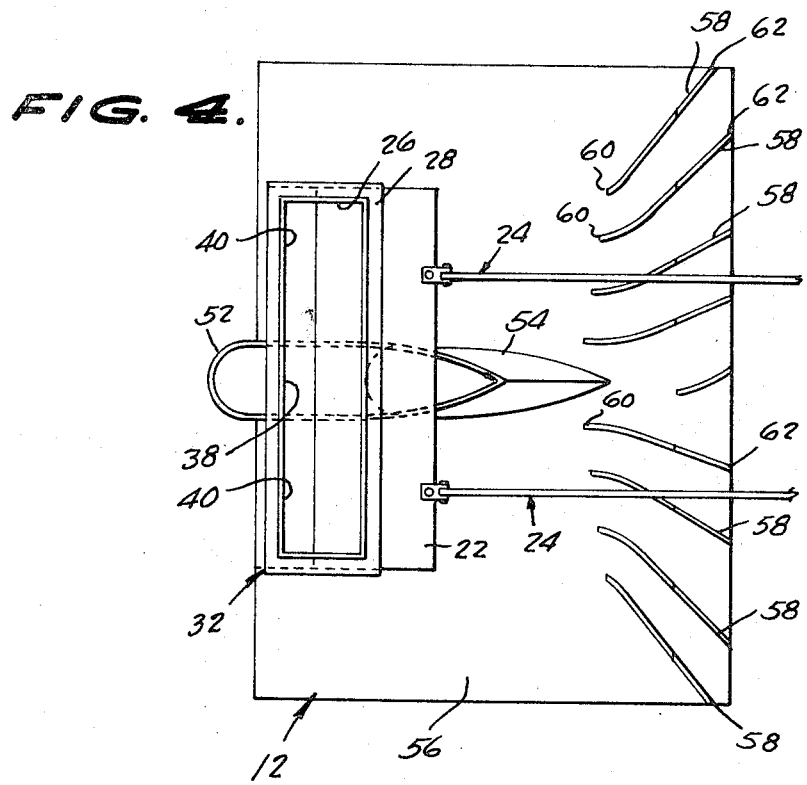
FIG. 4 is a top plan view of the spreader device of the present invention taken along the lines 4—4 of FIG. 3.

The outlet opening 20 communicates with the inlet opening 26 of the spreader device 12. The inlet opening 26, as best seen in FIG. 4, is substantially rectangular in configuration and is disposed so as to extend transversely of the longitudinal axis of the aircraft or plane 10. The portion of the spreader device adjacent the outlet opening 20 is provided with a suitable rim 28 that may be readily secured to a complementary rim 30, disposed adjacent the outlet opening of the hopper 14.

The spreader inlet opening 26 communicates with a substantially downwardly and rearwardly extending chute means 32. The chute means 32 is provided with a center chute 34 and side chute 36 on opposite sides of the center chute 34.

The center chute 34 is provided with an inlet opening 38, as best seen in FIG. 4, while the two sides or lateral chutes 36 are provided with inlet openings 40. The inlet openings of the chutes communicate with the outlet opening 20 of the storage hopper 14 when the spreader device is properly secured to the storage hopper 14.

The side chutes 36 extend diagonally downwardly as indicated at 42, and then rearwardly as indicated at 44, as best seen in FIG. 5. The interior of these side chutes are provided with vanes or deflectors which guide the material flowing therethrough, which vanes 46 have a similar configuration and extend diagonally downwardly and then rearwardly as does the front walls 42 and 44.

The center chute 34 extends substantially below and rearwardly of the lower edge 48 of the side chutes, and is preferably of a box configuration in cross-section with its lower edge indicated at 50, as seen in FIG. 6. The front side of the center chute 34 is provided with a streamline fairing 52 while the rear side is provided with a tapered streamline fairing 54 to reduce the drag to a minimum.

Disposed adjacent the lower portion of the rearwardly extending center chute 34 is a substantially horizontal air foil wing 56. The configuration of the streamlined air foil spreader wing 56 contributes to and increases the lift of the aircraft and thus improves the aircraft performance. It will be noted that the upper surface of the wing 56 is disposed in spaced relationship with the lower edges 48 of the side or lateral chutes and that the wing 56 is further provided with a plurality of deflector vanes 58 adjacent the rear portion thereof. It will be noted that the vanes 58 are substantially vertical, as best seen in FIGS. 2 and 5, while these vanes 58 are disposed laterally of each other on the horizontal wing 56, as best seen in FIG. 4. It will be further noted that the deflector vanes 58 are curved or flared outwardly so that their front or leading edges 60 are disposed inwardly of their trailing edges 62 in order to disperse the material discharged from the hopper 14 and the side chutes in a laterally outwardly direction as the material is spread over the area to be fertilized or covered with the discharge material. It will also be apparent, with reference to FIG. 4, that the leading edges 60 of these deflector vanes 58 are disposed adjacent the rear portion of the fairing 54.

In operation, when it is desired to spread or discharge material such as fertilizer and the like from the aircraft over a field for growing crops, the storage hopper 14 is filled with the material to be discharged. Thereafter, the aircraft is operated and when desired, the pilot can meter the proper amount of material to be discharged from the storage hopper through the outlet opening thereof by operating the linkage 24 so as to open the closure gate 22 to the desired amount. Thereafter, the material will be dispensed through the bottom portion 16 of the hopper and into the openings 40 and 38 of the side and center chutes, respectively. The material will pass through the side chutes 36 and be guided by the deflector vanes 46 therein, and the material will be discharged from the bottom edge 48 of the side chutes, as indicated by the arrows in FIG. 5. The momentum of the falling material in the side chutes, and the backward angle of the side chutes, causes the material to be directed aft relative to the aircraft. Additionally, as the material is drawn from the side chutes by the low pressure generated as the air stream passes over the curved upper surface of the spreader wing 56, it is accelerated still more in a direction opposite to that of the aircraft. At the relatively high velocity at which it is discharged, it impinges the deflector vanes 58, which are set at varying angles across the spreader swing 56, and the material is deflected laterally outwardly from the center of the aircraft, and caused to be deposited in a wide swath on the ground. In addition to the lateral dispersing effect of these lateral deflector vanes, a wing tip vortex is generated by the spreader wing 56 as it moves through the air and this vortex entrains some of the lighter material and then deflects it outwardly of the spreader wing side edges.

With respect to the material that is fed from the center chute 34, this material falls down below the spreader device and out into the aircraft slipstream below the aircraft center, where it is dispersed somewhat laterally by the propellor slipstream and general turbulence around the aircraft and the spreader device.

Refering to the invention shown in FIGS. 7 to 10, it provides a spreader wing 62 which comprises two separate and quickly removable sections 64, which attach to the center chute 34 by means of quick fastener members 66. These members 66 are quickly removable, lateral supports, which are disposed on opposite sides of the center chute 34, and have their upper ends connected to a horizontal frame 68 which may be secured to the hopper in which the fertilizer material is carried. Referring to FIG. 7, the upper end of the supports 66 are shown detachably connected by quick fastening members or bolts to the frame 68 and the lateral chute is not shown in this figure for purposes of clarification.

The lower end of the supports are connected to the two separate wing sections 64 disposed on opposite sides of the center chute and the fairing. The portions of the wing sections 64 adjacent the center chute 34 and the fairing is provided with angle members 70 for attaching the inner ends of the wing sections to the center chute and the fairing. These angle members are also quickly removable so that the wing sections may be removed from the center chute.

By making the wing sections quickly removable, as described, they can be removed and placed in the hopper, or in any other place in the aircraft as desired, when it is being ferried from one site to another. Further, removal of the wing sections when the aircraft is not being used for dispersal operations, reduces the drag and improves the aircraft's efficiency and performance.

The provision of the quickly removable wing sections from the center chute and fairing makes it possible to position the wing vertically relative to the lateral discharge chutes to achieve an optimum configuration for a wide variety of materials at varying rates of dispersal. The lateral support members which connect the wing sections to the frame can be of various lengths so that the wing spreader may be positioned at various vertical levels, as desired, which is required for a particular or specific dispersal operation. Thus, this provision of a quickly removable and adjustable height or distance of the wing sections from the frame provides great flexibility in dispersal operations.

When the lateral supports 66 are used, several sets of supports are required, with one set for each vertical position of the wing. The supports or sets that are not in use will be carried on the bottom of the wing section attached to it by the same fasteners that are used for installation. This permits the wing sections to be quickly repositioned in the field when and if they are required.

Referring to the deflector vanes 72, it will be seen that these deflectors or guide vanes are also quickly detachable or quickly removable from each wing section 64. Each deflector vane 72 is provided with a small rod or bar 74 adjacent its rear end and adjacent its front portion, as best seen in FIG. 10, which are adapted to fit into two hollow sleeves or sockets 76 secured to the wing 62. The rods 74 may be secured to the sockets or sleeves 76 by pins or other suitable means. With the deflector vanes being quickly detachable or removable from the respective sockets 76, it is apparent that the deflector vanes can be removed to alter the distribution pattern or narrow the swath width, if desired.

Also, with certain materials, such as dust and fine granulars, these deflector vanes can be removed completely and the wing sections 64 may then be positioned up close to the lateral chute to increase the "Venturi" effect. In this position, the air flow about the spreader wing 62 and the tip vortices generated by the spreader wing are used to disperse these light materials laterally into the air flow about the aircraft.

It will be noted that the deflector vanes 72 are disposed in spaced relationship with the upper surface of the spreader wing 62 as is best seen in FIG. 10. This provides a gap or air passage opening at the bottom of the vane or deflector, and a small auxiliary airfoil at the top, which airfoil is indicated at 78. The air passage permits the air to flow underneath the vanes and thus increases the velocity of air and material flowing through them and results in lower drag in a wider lateral dispersion of materials having some relative particle mass.

Referring to FIG. 9, it will be noted that the airfoil 78 are substantially rectangular in configuration when viewed from the top and the individual airfoils adjacent vanes 72 form complementary parts or all of them together form an airfoil extending across the spreader wing 62 transversely. These small auxiliary airfoils at the top of the vanes are used to maintain a smooth flow of air over the spreader wing and thus augment the flow of air and material through the vanes. These auxiliary airfoils 78, since they are formed of short span-wise segments attached an integral to each deflector vane 72, when all of the vanes are in place, each airfoil segment complements those adjacent to it to form the continuous total auxiliary airfoil.

A small adjustable flap 80 has been incorporated in the lower trailing edge of each section 64 of the spreader wing 62. This further increases the vortex generation and downward flow of air behind the spreader wing, as may be desirable with light materials or for foilage penetration and disturbance.

Referring to FIG. 10, it will be noted that the flaps 80 are positioned in any one of several deflected positions by means of an adjustable mechanical linkage 82 and 84. The linkage 84 may be attached to the sleeve or socket 76 and the linkage 82 may have several openings therein so that the linkage 84 may be positioned in any one of the various holes along the linkage 82 and thus positioned at any desired angle.

Thus, from the foregoing description, it is apparent that the present invention provides a low-drag, wing-type spreader device for the dispersal of seeds, granular material and chemicals from an aircraft over a wide area and with uniform distribution thereof, and in which the device is provided with a center chute and side chutes for distributing the material both below the aircraft slip-steam center and the material from the side chutes is deposited on the spreader wing and guided laterally outwardly by a plurality of vanes thereon.

Inasmuch as various changes may be made in the relative location, form and arrangement of the several parts of the invention, without departing from the essential characteristics of the invention, it will be understood that the invention is not to be limited, except by the scope of the appended claims.

What is claimed is:

1. A material spreader device for use with an aircraft and the like, comprising chute means extending diagonally downwardly for discharging material from the lower ends thereof, and a wing span with an air foil configuration secured to said chute means for giving the device an air lift effect, and guide means on said wing span disposed to move material discharged from said chute means in a lateral direction, wherein said chute means includes a center chute and side chutes on each side of said center chute, and wherein said center chute is provided with fairings to eliminate drag and said center chute extends substantially below said side chutes and said wing span.

2. The device of claim 1 wherein said side chutes and center chute form a substantially box-like structure adjacent their upper portions, and said side chutes extend diagonally downwardly and then rearwardly, and their lower edges are spaced from the upper surface of said wing span and adjacent the forward edge of said wing span for discharging material thereon.

3. The device of claim 2 wherein said guide means comprise a plurality of curved substantially vertical vanes on the rear portion of said span, spaced laterally of each other, and with their rear edges spaced laterally outwardly of their forward edges.

4. The device of claim 3 wherein said side chutes are provided with deflectors therein to discharge material in a rearward and downwardly direction.

5. The device of claim 4 wherein said chute means are provided with an inlet opening adjacent the top thereof and gate means for closing off said inlet opening.

6. The device of claim 5 wherein said center chute fairing comprises a semicircular configuration adjacent its front side and a converging tapered fairing adjacent its rear side.

7. A material spreader device for use with an aircraft and the like, comprising chute means extending diagonally downwardly for discharging material from the lower ends thereof, and a wing span with an air foil configuration secured to said chute means for giving the device an air lift effect, and guide means on said wing span disposed to move material discharged from said chute means in a lateral direction, wherein said chute means includes a center chute and side chutes on each side of said center chute, and wherein said wing span is separated into two sections detachably connected to opposite sides of said center chute by fastener members, and lateral supports detachably connecting said sections to the material spreader device.

8. A material spreader device for use with an aircraft and the like, comprising chute means extending diagonally downwardly for discharging material from the lower ends thereof, and a wing span with an air foil configuration secured to said chute means for giving the device an air lift effect, and guide means on said wing span disposed to move material discharged from said chute means in a lateral direction, wherein said guide means are a plurality of vertical vanes on the rear portion of said span and in spaced relationship from the upper surface of said span, and wherein socket means are provided on said span and rod means are provided on said vanes adapted to fit into said socket means.

9. The device of claim 8 wherein an airfoil is provided on top of each vane and said vanes and their respective airfoils form complementary segments.

10. The device of claim 9 wherein flap means are provided adjacent the lower rear portion of said span and adjustable linkage means connects them to said socket means.

References Cited

UNITED STATES PATENTS

| | | | |
|---|---|---|---|
| 1,580,301 | 4/1926 | Johnson | 244—136 |
| 1,722,467 | 7/1929 | Huff | 244—136 |
| 2,427,987 | 9/1947 | Wilson | 244—136 |
| 2,772,061 | 11/1956 | Sellers | 244—136 |
| 2,812,913 | 11/1957 | Nissen | 244—136 |
| 3,204,895 | 9/1965 | Razak | 244—136 |

MILTON BUCHLER, Primary Examiner

J. E. PITTENGER, Assistant Examiner